United States Patent [19]

Martin

[11] 4,131,726

[45] Dec. 26, 1978

[54] PERFLUOROELASTOMERS FROM HYDROFLUOROELASTOMERS

[75] Inventor: Jon W. Martin, Los Alamitos, Calif.

[73] Assignee: TRW Inc., Redondo Beach, Calif.

[21] Appl. No.: 768,136

[22] Filed: Feb. 14, 1977

Related U.S. Application Data

[63] Continuation of Ser. No. 495,490, Aug. 8, 1974, abandoned.

[51] Int. Cl.$^2$ .............................................. C08F 8/22
[52] U.S. Cl. .................................. 526/18; 260/42.27; 526/43; 526/247
[58] Field of Search ................................... 526/18, 247

[56] References Cited

U.S. PATENT DOCUMENTS

| 3,580,889 | 5/1971 | Barney | 260/47 |
| 3,792,022 | 2/1974 | Jones | 526/247 |
| 3,812,206 | 5/1974 | Banks | 526/247 |

OTHER PUBLICATIONS

A. L. Barney, "Journal of Polymer Science", Part A-1, vol. 8, pp. 1091–1098, 1970.

*Primary Examiner*—Paul R. Michl
*Attorney, Agent, or Firm*—Donald R. Nyhagen; John J. Connors

[57] ABSTRACT

This invention relates to new and improved fluoroelastomers having fluorinated crosslinks and more specifically to fluoroelastomers containing ether groups and perfluorovinylether groups, the fluoroelastomer having been crosslinked with a hydrocarbon cure catalyst and then reacted with fluorine.

2 Claims, No Drawings

PERFLUOROELASTOMERS FROM HYDROFLUOROELASTOMERS

This is a continuation of application Ser. No. 495,490, filed Aug. 8, 1974, now abandoned.

THE INVENTION

The production of fluoroelastomers containing perfluoro (vinyl ether) groups is well known and described in U.S. Pat. Nos. 3,810,875; 3,810,874; 3,580,889 and 3,467,638 which are incorporated by reference herein. Typical perfluoroelastomers include a copolymer (65/35 mole percent) of tetrafluoroethylene with perfluoro (methyl vinyl ether) and a crosslinking site. The polymer may be prepared by emulsion copolymerization with a redox catalyst. When cured with hydrocarbon crosslinks, these elastomers have an excellent service life up to 600° F. By comparison, "Viton-type" hydrofluoroelastomers which are produced by copolymerizing vinylidene fluoride and hexafluoropropylene do not perform as well at these temperatures. The differences in service lives arise from the fact that Viton-type polymers have some hydrogen atoms attached to the carbon atoms of the polymer backbone whereas perfluoroelastomers containing perfluoro (vinyl ether) groups do not have this hydrogen atom linkage to the backbone carbon atoms. Comparative data between Viton-type and perfluoro (vinyl ether)-type elastomers are disclosed in the article, "A High-Performance Fluorocarbon Elastomer" by A. L. Barney, W. J. Keller and N. M. van Gulick, in the Journal of Polymer Science: Part A-1, Vol. 8, 1091–1098 (1970).

If they are to be vulcanized, the perfluoro (vinyl ether) elastomers must be reacted with a crosslinking agent. This requires that an activated crosslinking site must be established adjacent to, or as a part of the polymer backbone since the polymer has such low chemical reactivity. Then, this crosslinking site must be reacted with a difunctional curative agent. In the present practice, these agents are hydrocarbons with difunctional end-groups. Consequently, when in service, chemical or thermal degradation of the vulcanized product tends to occur at the hydrocarbon sites. Furthermore, no presently available perfluorinated, crosslinked elastomer is known.

According to the invention, the hydrocarbon reaction sites are eliminated after the vulcanization reaction by fluorinating the crosslinked material. If performed properly, the new fluorination reaction of this invention will not degrade the elastomer by bond scission at the hydrocarbon site, but instead will replace the hydrogen atoms at the hydrocarbon sites with fluorine atoms which are more stable. This provides a new and significantly improved perfluorinated elastomer compared to present vulcanized materials, all of which contain at least a few mole percent hydrogen atoms.

Direct fluorination of fluoroelastomers is disclosed in U.S. Pat. Nos. 3,639,510; 3,642,753; and 2,497,046; however, the fluorination described is of the surface variety and is designed:

A. to effect saturation of double bonds solely on the fluoroelastomer surface; or,
B. to provide sites for graft copolymerization; or,
C. to substitute fluorine atoms in the polymer backbone for less stable halogen atoms such as chlorine or bromine.

In the present invention, it has been found, surprisingly, that when perfluoro (vinyl ether) elastomers are crosslinked with a hydrocarbon agent, subsequent fluorination of the crosslinked elastomer will result in preferential substitution in the hydrocarbon crosslink of fluorine atoms rather than either chain scission, reaction at the ether linkage, or reaction at a double bond site. Furthermore, the by-product gas HF will not react with the crosslinked elastomer.

A suitable fluorination reaction depends primarily on the physical dimensions of the crosslinked hydrofluoroelastomer item to be fluorinated. Typical conditions include a reaction time of about 12–24 hours, a temperature of about ambient (e.g., 75° F) and at a pressure varying from a low vacuum at the outset of the reaction to about 1 atmosphere upon completion. The reaction is carried out in the absence of air to eliminate $O_2$, $H_2O$, etc., which are undesirable. Inert diluents such as nitrogen, argon, helium, deaerated fluorinated fluids, etc., may be employed together with the fluorine, to control the reaction if necessary. Care should be taken to avoid temperatures which greatly exceed ambient and to avoid contaminant gases such as air or oxygen since these will result in combustion of the carbon-bearing polymer.

The fluorination reaction can be monitored by analyzing for the evolution of hydrogen fluoride which results from the reaction of fluorine and the hydrocarbon sites of the crosslinkage. The fluorination reaction is complete upon cessation of hydrogen fluoride production.

Fillers may be employed with the elastomer if desired. When used, they should be anhydrous, neutral or acidic, non-toxic and inert to fluorine. Suitable fillers include: $TiO_2$, $CaF_2$ and $BaSO_4$.

EXAMPLE

In a typical reaction, a terpolymer of tetrafluoroethylene, perfluorophenyl ethylene and perfluoro (methyl vinyl ether) is prepared using an aqueous emulsion containing a free radical catalyst. This disclosed in the paper entitled, "A High Performance Fluorocarbon Elastomer" by A. L. Barney, W. J. Keller and N. M. van Gulick, in the Journal of Polymer Science: Part A-1, Vol, 8, 1091–98(1970).

The terpolymer has the formula:

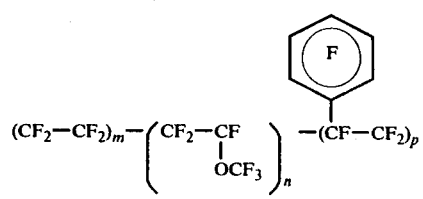

where $m$, $n$ and $p$ are about 64, 34 and 2 mole percent respectively.

Crosslinking may be achieved with a suitable agent such as the dipotassium salt of poly(ethylene oxide) which has the formula:

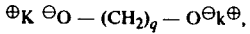

where $q$ is about 1 to 12 or by the dipotassium salt of a bis (benzimidazole).

Other suitable crosslinking agents are disclosed in U.S. Pat. No. 3,580,889 (supra) incorporated herein by reference.

The polymer, following crosslinking, is reacted with fluorine under vacuum and at ambient temperature of about 75° F (22° C). Hydrogen fluoride is formed during the reaction and may be continually removed, if desired. Fresh fluorine may be introduced during the reaction. A pressure buildup of hydrogen fluoride and fluorine to about one atmosphere is permitted to occur over a 12- to 24-hour period, depending on the size and shape of the object formed from the polymer. In the case of O-rings of 1.00-inch diameter and 0.109-inch cross-section, about 12 hours fluorination is suitable. The reaction is considered terminated when no additional hydrogen fluoride is evolved as measured by gas chromotography. This indicates no further hydrogen groups are available for reaction with the fluorine and represents an elastomer on which the crosslinks have been highly fluorinated as shown in Table 1, infra. However, useful properties of the vulcanized elastomer are obtained when the crosslinks have been fluorinated to only about one-half of the highly fluorinated product as shown in Table 1.

The above O-ring weighing about 1.5 grams absorbed about 0.05 gram of fluorine at about 75° F (22° C).

The crosslinked O-rings which were fluorinated at two levels were then contacted with a strongly oxidizing environment ($N_2O_4$ at 160° F), and subjected to tensile and elongation tests as shown in Table 1 which follows. It is apparent that the highly fluorinated material has more resistance to change in properties in an oxidizing environment and exhibits slightly superior properties to the nonfluorinated control material which had no exposure whatsoever to the oxidizing environment.

TABLE 1

COMPATIBILITY WITH PURE $N_4O_4$

| | $M_{100}$, psi[1] | $T_B$, psi[1] | $E_B$, %[1] |
|---|---|---|---|
| No Fluorination - No oxidation exposure | 550 | 1770 | 200 |
| No Fluorination - 8 Days/160° F oxidation | 495 | 1510 | 280 |
| Partial Fluorination[2] 8 Days/160° F oxidation | 310 | 1770 | 280 |
| High fluorination[3] 8 Days/160° F oxidation | 590 | 1880 | 230 |
| Partial Fluorination[2] 8 Weeks/160° F oxidation | 380 | 1240 | 290 |
| High Fluorination[3] 8 Weeks/160° F oxidation | 530 | 1800 | 240 |

[1]ASTM D412 Die "D." Tested at 20-inch per minute crosshead speed.
[2]Fluorinated to about one-half the weight increase observed for the high fluorination sample.
[3]Fluorinated until no additional HF evolution was observed.

In Table 2, a comparison is shown between a non-fluorinated control and the fluorinated specimen of the Example when exposed to pure $N_2O_4$ for varying lengths of time. Both samples contained 9.1% by weight of $TiO_2$ filler. It will be apparent that the mechanical properties of the perfluorinated material are significantly improved compared to the control.

TABLE 2

EFFECT OF $N_2O_4$ ON MECHANICAL PROPERTIES OF FLUORINATED AND NON-FLUORINATED SPECIMENTS

| Storage Temperatures[a] | Non-Fluorinated Control Specimen | Fluorinated[b] Specimen |
|---|---|---|
| Ambient | $M_{100} = 360$<br>$T_B = 465$<br>$E_B = 185$ | $M_{100} = 1110$<br>$T_B = 2550$<br>$E_B = 190$ |
| 125° F | $M_{100} = 275$<br>$T_B = 410$<br>$E_B = 150$ | $M_{100} = 1040$<br>$T_B = 2840$<br>$E_B = 200$ |
| 160° F | $M_{100} = —$<br>$T_B = 475$<br>$E_B = 80$ | $M_{100} = 495$<br>$T_B = 1490$<br>$E_B = 250$ |

[a]Stored 50 days in $N_2O_4$ at indicated temperature, plus 120 days at ambient room temperature. Tested 150 days after removal from the propellant.
[b]Fluroinated until no additional HF evolution was observed.

It will be apparent from the data that the perfluoroelastomer of this invention renders it especially useful for hydrazine containing bladders which can be employed in spacecraft; other uses include gaskets.

I claim:

1. An improved method of making a perfluoroelastomer of tetrafluoroethylene, perfluoro (alkyl vinyl ether), and a cross-linking component, wherein said perfluoroelastomer is vulcanized by the reaction between the cross-linking component and a difunctional curing agent including carbon to hydrogen bonds that remain intact after vulcanization, the improvement comprising fluorinating the vulcanized perfluoroelastomer to replace the hydrogen atoms of the reacted curing agent with fluorine atoms to a sufficient degree that the fluorinated elastomer is substantially more resistant to oxidation than the non-fluorinated elastomer.

2. The improved method of making a perfluoroelastomer of claim 1 where the cross-linking component includes a perfluorophenyl group.

* * * * *